United States Patent
Hanzawa et al.

(10) Patent No.: US 6,627,143 B2
(45) Date of Patent: Sep. 30, 2003

(54) SIC—C/C COMPOSITE MATERIAL, USES THEREOF, AND METHOD FOR PRODUCING THE SAME

(75) Inventors: Shigeru Hanzawa, Kagamigahara (JP); Kenji Nakano, Tokai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/011,060

(22) Filed: Dec. 6, 2001

(65) Prior Publication Data

US 2002/0084558 A1 Jul. 4, 2002

Related U.S. Application Data

(62) Division of application No. 09/496,377, filed on Feb. 2, 2000, now Pat. No. 6,355,206.

(30) Foreign Application Priority Data

| Feb. 9, 1999 | (JP) | 11-031979 |
| Apr. 8, 1999 | (JP) | 11-101881 |
| Jan. 14, 2000 | (JP) | 2000-5168 |

(51) Int. Cl.[7] .............................................. C21C 5/42
(52) U.S. Cl. ................... 264/657; 264/682; 266/286; 428/293.4
(58) Field of Search ................ 501/95, 99; 266/239, 266/286; 428/293.4, 293.7; 264/657, 682

(56) References Cited

U.S. PATENT DOCUMENTS

| 4,998,879 | A | | 3/1991 | Foster et al. |
| 5,685,701 | A | | 11/1997 | Chandler et al. |
| 5,876,659 | A | | 3/1999 | Yasutomi et al. |
| 6,162,544 | A | | 12/2000 | Hanzawa |
| 6,355,206 | B1 | * | 3/2002 | Hanzawa et al. ............ 266/239 |
| 6,358,565 | B1 | * | 3/2002 | Krenkel et al. ............. 427/343 |
| 6,413,640 | B1 | * | 7/2002 | Hanzawa et al. ............ 428/408 |
| 6,472,058 | B2 | * | 10/2002 | Hanzawa et al. ......... 428/293.4 |
| 2001/0024726 | A1 | * | 9/2001 | Hanzawa et al. ............ 428/698 |
| 2001/0026871 | A1 | * | 10/2001 | Hanzawa et al. ............... 35/56 |
| 2001/0051258 | A1 | * | 12/2001 | Hanzawa et al. ......... 428/293.4 |
| 2002/0006506 | A1 | * | 1/2002 | Hanzawa et al. ......... 428/293.1 |
| 2002/0028294 | A1 | * | 3/2002 | Krenkel et al. ............. 427/343 |
| 2002/0084558 | A1 | * | 7/2002 | Hanzawa et al. ............ 266/236 |

FOREIGN PATENT DOCUMENTS

| EP | 1 028 098 A2 | * | 8/2000 |
| GB | 1 457 757 | | 12/1976 |
| JP | 10-130081 | | 5/1998 |
| JP | 2000351672 A | * | 12/2000 |
| WO | 99/19273 | | 4/1999 |

* cited by examiner

Primary Examiner—Scott Kastler
(74) Attorney, Agent, or Firm—Burr & Brown

(57) ABSTRACT

SiC—C/C composite materials having a suitable kinetic coefficient of friction, good corrosion resistance in strongly oxidizing and corrosive environments, good creep resistance and spalling resistance, and high hardness. The materials are hardly oxidized or abraded even when exposed to high temperatures, while maintaining the excellent impact resistance and light weight of C/C composites. Molten metal pumps using the materials are provided from which components do not dissolve into the molten metal even when used in molten metal and have sufficient thermal impact resistance and oxidation resistance.

2 Claims, 6 Drawing Sheets

SIC— C/C COMPOSITE MATERIAL, USES THEREOF, AND METHOD FOR PRODUCING THE SAME

CROSS REFERENCE TO RELATED APPLICATION

This application is a division of U.S. application Ser. No. 09/496,377, filed Feb. 2, 2000, now U.S. Pat. No. 6,355,206 B1, the entirety of which is incorporated herein by reference.

BACKGROUND OF THE INVENTION AND RELATED ART

1. Field of the Invention

The present invention relates a novel SiC—C/C composite material usable as jigs for molten metal requiring oxidation resistance at high temperatures, such as molten metal carrying pumps used in molten metal or molten metal pumps for removing dross, grinding members requiring oxidation resistance at high temperatures, sliding members such as rolling bearings and plain bearings used in apparatuses for making semiconductors, precision instruments, cars and aircraft parts, and braking members used as friction materials for brake disks fitted so as to gear with speed control devices used for stopping or controlling of speed of mass-transportation means such as large cars, ultra-high speed trains, and aircraft. The invention further relates to a method for producing the composite material.

2. Related Art Statement

Aluminum-zinc alloys, SUS and other various alloys are used as jigs for molten metal, but since they are used at high temperatures, the life thereof is short, namely, about one week. Therefore, they must be frequently changed, and the changing operation at high temperature is very difficult. Thus, demanded are those materials which do not give substances contaminating the metal in the molten metal and are high in abrasion resistance, oxidation resistance and endurance, and can be used for a long period of time at high temperatures.

For example, plating of steel sheets for cars is carried out by dipping the steel sheets to be plated in metals such as zinc and aluminum molten by heating (molten metal). However, when the materials to be plated are repeatedly dipped, impurities in the molten metal grow in the form of particles to cause formation of solid suspended materials (dross) in the molten metal. If the plating is continued as it is, plating thickness becomes uneven or appearance of the plated articles becomes poor.

Therefore, in metal plating step, the plating operation is carried out with removing dross by a molten metal pump. FIG. 9 shows an example of the molten metal pump. In FIG. 9, steel sheet 11 which is a material to be plated is plated by dipping it in molten metal 13 by means of pulley 12 in a hydrogen atmosphere. Molten metal pump 14 is generally provided with dross storage portion 15 and dross passage 16 having openings at both ends. One end opening of dross passage 16 communicates with molten metal 13 outside the dross storage portion 15 and another end opening of dross passage 16 communicates with molten metal 13 inside the dross storage portion 15. Furthermore, the dross passage 16 has impeller 18 for bringing about a liquid flow from one end side to another end side fitted to revolving shaft 17 in another side of the dross passage. In the molten metal pump 14 shown in FIG. 9, the inner space of inner container 20 forms the dross storage portion 15 and the space between the inner wall of outer container 21 and outer wall of the inner container 20 forms the dross passage 16.

Sliding materials such as rolling bearings and sliding bearings are widely used in various fields such as semiconductors, ceramics, electronic parts and manufacture of vehicles as constitutive members of apparatuses for making semiconductors, precision instruments, cars and aircraft parts. Especially, at present, with the rapid progress of technical innovation, sliding materials used for sliding bearings, sliders, bearing holders, etc. in the fields of space development such as shuttle spacecraft and spaceplanes, and fields of energy such as nuclear energy, solar energy and hydrogen energy, are used at high temperatures of higher than 400° C., at which oil cannot be used as a lubricant owing to burning or carbonization, or at low temperatures at which oil freezes. Therefore, sliding materials per se must have a kinetic coefficient of friction as small as possible and must hardly be worn. Furthermore, naturally, these sliding materials are required to have high strength and high reliability (tenacity and impact resistance) at moderate to high temperatures (200–2000° C.), and environmental resistance (corrosion resistance, oxidation resistance and radiation resistance). Moreover, due to the recent demand for energy savings, sliding materials are also required to be light in weight so that they can be driven by small loading.

Under the circumstances, silicon nitride or silicon carbide materials which are excellent in heat resistance and high in strength have hitherto been used as sliding materials, but these have a great kinetic coefficient of friction of 0.5–1.0 and are apt to cause wear of other materials and are not necessarily suitable as sliding materials. In addition, they are high in density and consume great energy for driving and have a large kinetic coefficient of friction. Moreover, they are brittle per se, and are considerably brittle if flawed and, moreover, have insufficient strength against thermal and mechanical shocks.

As a means for solving these defects, ceramic composite materials (CMC) comprising composites of continuous ceramic fibers have been developed and used as sliding materials. These materials are high in strength and tenacity even at high temperatures and have excellent impact resistance and environmental resistance, and, thus, they are being studied mostly in Europe and America as main refractory sliding materials.

On the other hand, as friction materials used in braking devices fitted to mass-transportation means such as large cars, ultra-high speed trains, and aircraft, carbon fibers-in-carbon often called C/C composites, which are very high in friction coefficient at high temperatures and light in weight, are widely used at present. In these mass-transportation means, it is common to continue braking for a long time depending on changes in driving circumstances or to repeatedly brake at high frequency. Therefore, in the case of braking devices using C/C composites as friction materials, the friction materials are exposed to high temperatures in the air for a long time. Accordingly, since friction materials using C/C composites are basically mainly composed of carbon fibers which readily burn at high temperatures, the carbon fibers react with oxygen under such conditions of being exposed to high temperatures for a long time to cause considerable wear or emission of smoke, leading to serious accidents. However, from the points of friction force at high temperatures and flexibility needed in fitting to disk brakes, substitutes therefor have not yet been discovered.

On the other hand, ceramic type SiC—C/C composite materials (CMC) comprising a composite of a ceramic matrix and fibers which are incorporated in the matrix have been developed in the following manner. That is, several hundred to several thousand ceramic long fibers of about 10

μm in diameter are bundled to form a fiber bundle (yam), these fiber bundles are arranged in planar or three-dimensional directions to form unidirectional sheets (UD sheets) or various cloths, or these sheets or cloths are laminated, thereby forming a preform (fiber preform) of a given shape, and a matrix is formed in the preform by a CVI method (chemical vapor impregnation method) or an inorganic polymer impregnating and firing method or by filling the preform with ceramic powders by a cast molding method and then firing the preform to form a matrix.

As examples of CMC, there have been known C/C composites comprising carbon fibers arranged in planar or a three-dimensional direction between which matrices comprising carbon are formed, and SiC fiber-reinforced Si—SiC composites formed by impregnating a molded body comprising SiC fibers and SiC particles with metallic silicon. Moreover, British Patent No.1457757 discloses a composite material obtained by impregnating a C/C composite with metallic silicon to form SiC. In this composite material, a very common material is used as the C/C composite forming a skeletal part. That is, a phenolic resin as a binder is coated on carbon fibers of a suitable thickness, they are laminated in a uniform fiber direction so as to give the desired shape, and the laminate is put in a mold having a specific shape, followed by compressing and curing to obtain a molded body of C/C composite. This is fired and the fired body is impregnated with metallic silicon. The phenolic resin is carbonized by the firing, but the amount of the remaining carbon is at most about 50%, and after firing, many fine pores are present randomly around the carbon fibers. This is impregnated with metallic silicon, but it is very difficult owing to the random presence of the pores to uniformly impregnate the whole of the fired body with silicon. An SiC matrix is formed by the reaction of free carbon produced by carbonization of the phenolic resin used as a binder with metallic silicon used for impregnation, but, in this case, owing to the pores present randomly, the matrix does not become homogeneous and, simultaneously, metallic silicon also randomly reacts with carbon fibers to form an SiC layer on the carbon fibers. As a result, there is a problem in that the carbon fibers become short at the portion of the SiC layer being formed in at least a part of the composite material, resulting in deterioration of impact resistance, flexural strength, high lubrication and abrasion resistance.

Since C/C composites are high in tenacity, they are superior as braking members because of their excellent impact resistance, light weight and high hardness, but they are composed of carbon and hence cannot be used at high temperatures in the Presence of oxygen and have a limit in the use as refractory sliding materials. Moreover, since they are relatively low in hardness and in compression strength, abrasion wear is large when used as sliding materials or braking members.

On the other hand, SiC fiber-reinforced Si—SiC composites are excellent in oxidation resistance and creep resistance, but are apt to be flawed on the fiber surface. Moreover, SiC fibers are high in wettability with Si—SiC and these are firmly bonded and, hence, drawing effect between the mother body and the fibers is small. Thus, they are inferior to C/C composites in tenacity, and therefore low in impact resistance and are not suitable for sliding materials having complicated shapes or having a thin wall portion, such as bearings and sliders. Furthermore, they lack reliability for materials usable for a long time as jigs for molten metal used at high temperatures. Thus, materials high in reliability and usable for a long period of time have not yet been provided.

That is, in the above-mentioned molten metal pump 14, the members which contact with molten metal 13 of high temperature of 500–800° C., such as outer container 21, inner container 20, revolving shaft 17 and impeller 18, must be made of materials having impact resistance. Furthermore, if the material constituting the molten metal pump bleeds into the molten metal, quality of the plated articles is affected, and so there must be used materials which do not bleed out at high temperatures. Moreover, the materials constituting the molten metal pump must have oxidation resistance because they are sometimes used in the air. From these viewpoints, SIALON is used as the material of the outer container, etc. which contact with molten metal among the members constituting the molten metal pump.

SUMMARY OF THE INVENTION

An object of the present invention is to provide a novel SiC—C/C composite material which has a kinetic coefficient of friction within a range which does not damage sliding properties, has abrasion resistance, is light in weight, is excellent in impact resistance, creep resistance and spalling resistance, is high in hardness, and is hardly oxidized or worn even when exposed to high temperatures in the presence of oxygen. The material maintains the excellent impact resistance and light weight of C/C composites and is free from the defects of C/C composites which are used now as braking materials of mass-transportation means (i.e., changing operation at high frequency because of considerable wear which unavoidably occurs in the presence of oxygen caused by high temperatures). SIALON now used for the portions of molten metal pumps which require oxidation resistance has no problem in oxidation resistance, but is inferior in thermal impact resistance, and, for example, when it is used at 800° C. for 100 hours, cracks occur at the portions in the vicinity of the surface of the molten metal.

The molten metal pump which constitutes one aspect of the present invention has been accomplished under the above circumstances, and thus another object of the present invention is to provide a molten metal pump from which the components do not dissolve out when used in molten metal and which has sufficient thermal impact resistance and oxidation resistance. Still another object is to provide a novel SiC—C/C composite material which has high endurance usable as jigs for molten metal used at high temperatures of higher than 600° C., preferably higher than 800° C.

As a result of intensive research conducted by the inventors for attaining the above objects, it has been found that an SiC—C/C composite material comprising silicon carbide, carbon fibers and a carbon component other than carbon fibers and having a structure comprising a skeletal part and a matrix formed around the skeletal part, in which at least 50% of silicon carbide is of β type, the skeletal part is formed of carbon fibers and a carbon component other than carbon fibers, silicon carbide may be present in a part of the skeletal part, the matrix is formed of silicon carbide, the matrix and the skeletal part are integrally formed, and the composite material has a porosity of 0.5–5% and a two-peak type distribution of average pore diameter, can be used for making molten metal jigs, especially, molten metal pumps, thereby to be able to attain the above objects for the following reasons. Firstly, said SiC—C/C composite material is also excellent in oxidation resistance, creep resistance and spalling resistance and can also be used as sliding materials under such conditions that lubricants cannot be used due to high temperature conditions, in the presence of oxygen. Secondly, it exhibits excellent impact resistance and light weight as friction materials for brakes, shows sufficient abrasion resistance even in the presence of oxygen when used as friction materials for disk brakes which unavoidably generate high temperature, and does not require changing operation at high frequency as required for C/C composites and can be used continuously. Thirdly, it does not release components which contaminate the molten metal and has sufficient impact resistance and oxidation resistance. Thus, the present invention has been accomplished.

That is, the present invention provides an SiC—C/C composite material comprising silicon carbide, carbon fibers and a carbon component other than carbon fibers and having a structure comprising a skeletal part and a matrix formed around the skeletal part, characterized in that at least 50% of the silicon carbide is of β type, the skeletal part is formed of carbon fibers and a carbon component other than carbon fibers, silicon carbide may be present in a part of the skeletal part, the matrix is formed of silicon carbide, the matrix and the skeletal part are integrally formed, and the composite material has a porosity of 0.5–5% and a two-peak type distribution of average pore diameter.

Furthermore, the present invention provides a molten metal pump in which at least the portions which contact with molten metal are composed of the above SiC—C/C composite material. The molten metal pump according to another aspect of the present invention is preferably a molten metal pump which has a dross storage portion and a dross passage having openings at both ends and in which one end opening of the dross passage communicates with molten metal only at the surface portion of the molten metal outside the dross storage portion, another end opening of the dross passage communicates with molten metal only at the surface portion of the molten metal inside the dross storage portion, said dross passage is formed of a space defined by the inner wall of the outer container and the outer wall of the inner container constituting the dross storage portion, and the dross passage has an impeller on another end side which is fitted to a revolving shaft and brings about liquid flow from one end side and another end side, characterized in that at least the portions which contact with molten metal comprise the above SiC—C/C composite material. Furthermore, the molten metal pump is preferably one in which the portions which contact with the molten metal are the dross passage, the impeller and the revolving shaft. Moreover, the molten metal pump may be one which is used for molten zinc or molten aluminum.

The present invention further provides a method for producing the SiC—C/C composite material which comprises a step of keeping metallic silicon and a molded body comprising C/C composite or a C/C composite fired body in a furnace at a furnace inner temperature of 1100–1400° C. and under a furnace inner pressure of 0.1–10 hPa for 1 hour or more with flowing an inert gas in an amount of 0.1 NL or more per 1 kg of total weight of the molded body or the fired body and the metallic silicon, thereby reacting the carbon component constituting the matrix of the C/C composite with the metallic silicon to form a matrix comprising silicon carbide, a step of raising the furnace inner temperature to 1450–2500° C. with keeping the furnace inner pressure as it is thereby melting and impregnating the metallic silicon into open pores of the molded body or fired body to grow silicon carbide and simultaneously sufficiently filling the remaining pores with the metallic silicon, and a step of increasing the furnace inner pressure to about 1 atm. with once reducing the furnace inner temperature to environmental temperature or keeping the furnace inner temperature as it is, and raising the furnace inner temperature to 2000–2800° C., whereby the produced silicon carbide or metallic silicon filled in the pores is diffused from the matrix into the C/C composite composed of carbon fibers and a carbon component other than carbon fibers and is reacted with the carbon.

The SiC—C/C composite material of the present invention basically comprises 20–80% by weight of carbon and 80–20% by weight of silicon carbide, and the matrix comprising an SiC material is formed integrally between yarn assemblies comprising carbon fibers combined three-dimensionally and integrated so that they are not separated. Even if about 0.3% by weight of metallic silicon remains per total weight of the composite material, this gives substantially no influence to the performance of the composite material of the present invention. As mentioned hereinafter, when a layer of matrix formed of SiC material is provided, thickness thereof is preferably at least 0.01 mm, more preferably at least 0.05 mm, further preferably at least 0.1 mm.

Furthermore, in the novel SiC—C/C composite material of the present invention, it is preferred that the matrix has such a composition that content of silicon increases in inclined manner in proportion to the distance from the yarn. Moreover, the SiC—C/C composite material may contain at least one substance selected from the group consisting of boron nitride, boron, copper, bismuth, titanium, chromium, tungsten and molybdenum. In addition, it is preferred that the SiC—C/C composite material has a kinetic coefficient of friction of 0.05–0.6 at room temperature and a porosity of 0.5–5%.

DETAILED DESCRIPTION OF THE PREFERRED EMBODIMENTS

Figure 1:
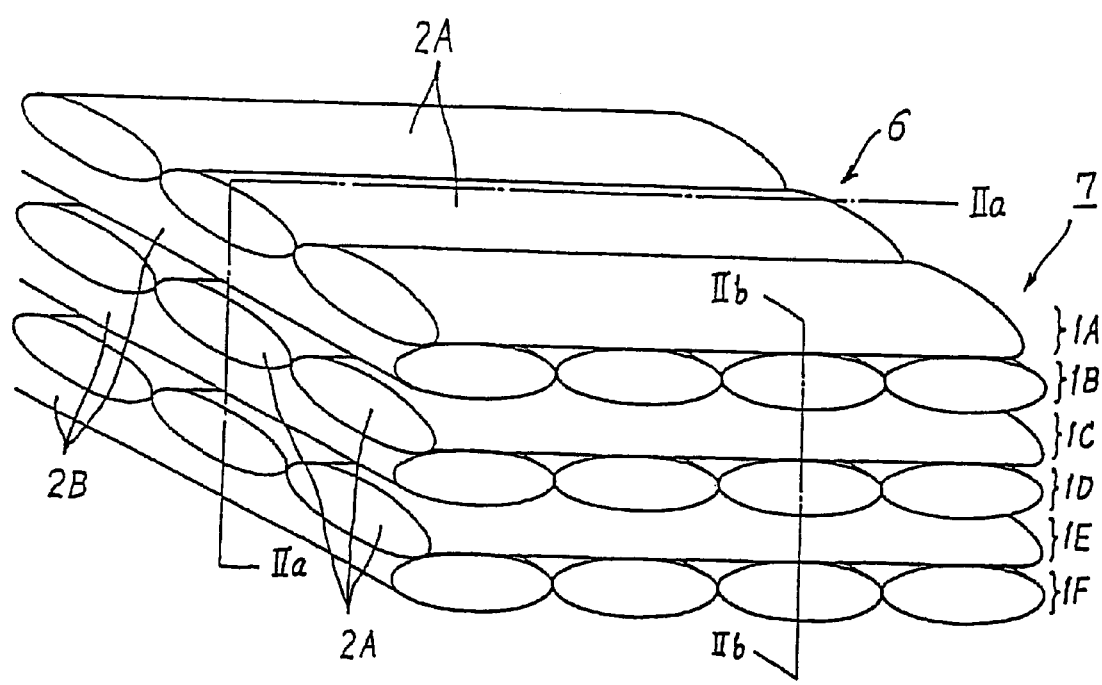
FIG. 1 is an oblique view which schematically shows the skeletal part of the SiC—C/C composite material of the present invention.

The SiC—C/C composite material of the present invention is formed of a composite material comprising ceramics and carbon which is provided with a skeletal part comprising a C/C composite and a Matrix layer comprising an SiC material.

The novel SiC—C/C composite material of the present invention will be explained below.

This is a material of new concept which comprises a novel C/C composite improved in its basic construction. In this specification, "C/C composite" means a molded body or a fired body obtained by firing the molded body, and the molded body is obtained in the following manner. Carbon fiber bundles are prepared by containing therein a pitch, a coke or the like as a powdery binder which acts as a matrix of carbon fiber bundles and becomes free carbon after firing and, if necessary, additionally a phenolic resin powder or the like and a flexible film comprising a plastic such as thermoplastic resin is formed around the carbon fiber bundles to obtain preformed yarns as flexible intermediate material. The preformed yarns are made into a sheet-like material by the method disclosed in JP-A-2-80639, a desired number of the sheets are laminated and the laminate is molded by a hot press to obtain a molded body.

The C/C composite used as a basic material can be produced in the following manner. Usually several hundred to several tens of thousands of carbon fibers of about 10 $\mu$m in diameter are bundled to form a fiber bundle (yarn). This fiber bundle is covered with a thermoplastic resin to obtain a flexible intermediate material. This is made into a sheet-like material by the method disclosed in JP-A-2-80639, and the resulting sheet-like materials are arranged in planar or three-dimensional directions to obtain unidirectional sheets (UD sheets) or various cloths, or the sheets or cloths are laminated to form a preform of a given shape (fiber preform). The film of a thermoplastic resin or the like formed on the outer surface of the fiber bundles of the preform is fired to carbonize and remove the film. The disclosure of JP-A-2-80639 is incorporated herein by reference. In the C/C composite used in the present invention, the carbon component other than the carbon fibers in the yarn is preferably a carbon powder, especially preferably a graphitized carbon powder.

In the SiC—C/C composite material of the present invention, a C/C composite composed of carbon fiber bundles is used as a skeletal part, and, therefore, even if SiC is formed in a part thereof, the structure of carbon fibers is retained without being broken and the length of the carbon fibers is not reduced by the silicon carbide. Thus, mechanical strength possessed by the C/C composite is nearly retained or increased by the silicon carbide. This is a great characteristic. Besides, the material has a composite structure in which a matrix comprising an SiC material is formed between the adjacent yarns in the yarn assembly.

The SiC material in the present invention is a material comprising silicon carbide differing in the degree of bonding to carbon, and this SiC material is produced in the following manner. In the present invention, C/C composite is impregnated with metallic silicon, and in this case the metallic silicon reacts with carbon atoms constituting the carbon fibers in the composite and/or free carbon atoms remaining on the surface of the carbon fibers to cause partial carbonization of the metallic silicon. Therefore, partially carbonized silicon is produced on the outermost surface of the C/C composite or between the yarns comprising carbon fibers, and thus a matrix comprising silicon carbide is formed between the yarns.

This matrix can contain some different phases from a silicon carbide-based phase, in which a very slight amount of silicon and carbon bond to each other, to a pure silicon carbide crystal phase. However, this matrix contains metallic silicon in an amount less than the limit of detection (0.3% by weight) by X-ray analysis. That is, this matrix typically comprises a silicon carbide phase, but the silicon carbide phase can contain a SiC-based phase in which the content of silicon changes in an inclined manner. Therefore, the SiC material is a generic name of SiC series materials in which carbon is contained in the range of 0.01–50 mol % in concentration. Control of the carbon concentration to less than 0.01 mol % is not practical because strict metering of the amount of the added metallic silicon is required in relation with the amount of free carbon in the C/C composite, and control of temperature at the final step mentioned hereinafter becomes complicated. However, it is theoretically possible to control the carbon concentration to about 0.001 mol %.

Figure 6:
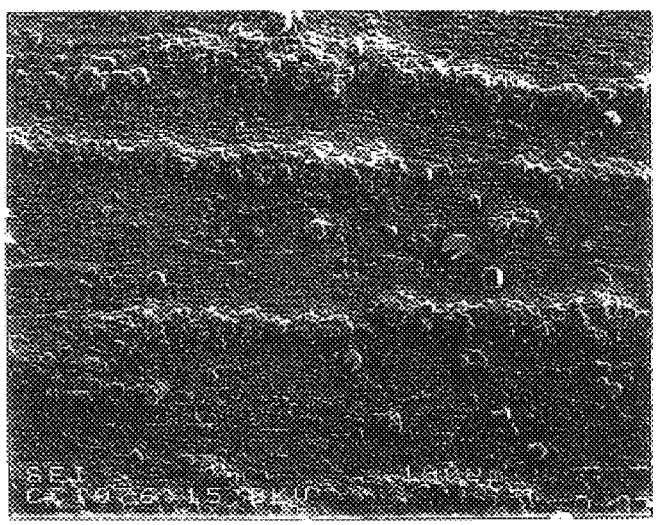
FIG. 6 is a photograph showing the state of small protrusions protruding from the surface of a test piece.

In the SiC—C/C composite material of the present invention, it is preferred that the material has a silicon carbide phase produced along the surface of the yarns and, in addition, a part of the matrix protrudes from the surface as small protrusions as shown in FIG. 6. This is especially preferred in the case of using as brake members, grinding members, etc. because the surface roughness is larger. In the SiC—C/C composite material, silicon carbide phase is formed between yarns. Therefore, the surface of the yarns is strengthened by the silicon carbide phase. Moreover, in the central portion of the matrix, there are formed pores of relatively large pore diameter of about 100 $\mu$m as a median, and, hence, microscopic stress dispersion occurs due to deformation of the pore portion depending on the stress applied.

Further, this SiC—C/C composite material preferably has a matrix having such inclined composition as the content of silicon increasing in proportion to the distance from the surface of the yarn. Moreover, in the SiC—C/C composite material, preferably the yarn assembly comprising carbon fibers is formed of a plurality of yarn array elements, and each of the yarn array elements is formed by two-dimensionally arranging yarns comprising a bundle of a specific number of carbon fibers in nearly parallel with each other, and the yarn assembly is constructed by laminating the yarn array elements. In this way, the SiC—C/C composite material has a laminate structure in which yarn array elements of a plurality of layers are laminated in specific directions.

In this case, it is especially preferred that the longer directions of the yarns in the adjacent yarn array elements cross each other. Thereby, dispersion of stress is further accelerated. The longer directions of the yarns in the adjacent yarn array elements especially preferably cross at right angles with each other. Furthermore, preferably, the matrix is continuous in the SiC—C/C composite material to form a three-dimensional network structure in the composite material. In this case, it is especially preferred that the matrices are two-dimensionally arranged in nearly parallel with each other in the respective yarn array elements, and the matrices produced in the adjacent yarn array elements is continuous to each other, whereby the matrices form a three-dimensional lattice. Moreover, the space between the adjacent yarns may be completely filled with the matrix, but only a part of the space may be filled with the matrix.

The SiC—C/C composite material of the present invention comprises a skeletal part composed of a C/C composite having a three-dimensional structure comprising a yarn assembly formed by laminating yarn array elements in which a specific number of yarns comprising carbon fiber bundles are arranged and an SiC material formed in the form of three-dimensional lattice as matrices between the yarns constituting the skeletal part. The SiC—C/C composite material of the present invention has a kinetic coefficient of friction in the range of 0.05–0.6 at room temperature, and furthermore the low oxidation resistance of C/C composite can be overcome by providing on the surface a matrix layer of SiC material having oxidation resistance, creep resistance and spalling resistance. Thus, the SiC—C/C composite material can be used as sliding materials, members for braking and members for molten metal which are unavoidably exposed to high temperatures in the presence of oxygen. Since the porosity is controlled to 0.5–5%, variation of kinetic coefficient of friction caused by change of environment is very small, and stable braking performance can be exhibited. Abrasion wear at high temperatures is preferably 1.0%/hour or less, more preferably 0.6%/hour or less at 500° C. Moreover, the material has abrasion resistance resulting from the excellent abrasion resistance inherently possessed by silicon carbide.

Furthermore, since the SiC—C/C composite material has as the skeletal part a C/C composite basically composed of a yarn assembly comprising carbon fiber bundles, it is light in weight and meets the demand for energy savings. Especially, since the carbon fibers do not become short fibers after formation of the matrix as already mentioned above, the mechanical strength is maintained, and since the longer directions of the fibers of the respective yarn array elements cross each other, preferably cross at right angles with each other in the yarn assembly, no anisotropy in shape occurs. The matrix comprising free carbon formed in the skeletal part has high uniformity. Therefore, in the SiC—C/C composite material of the present invention produced by impregnation with metallic silicon, the metallic silicon uniformly disperses and reacts with carbon, and hence the composition of the constituting substances in a specific volume is uniform. Since the composition is uniform, internal stress is evenly distributed. Therefore, deformation hardly occurs by sintering, and large molded articles of complicated shape, especially, large and thin-wall molded articles of complicated shape can be produced.

Moreover, since the skeletal part comprises C/C composite, the material is high in tenacity, excellent in impact resistance and high in hardness. Accordingly, the defect of low high-temperature abrasion resistance of the conventional C/C composites can be overcome with retaining the characteristics of the C/C composites. Further, since the C/C composites have continuous open pores, SiC as a matrix formed by impregnating metallic silicon through the pores forms a continuous structure and a three-dimensional network structure. Therefore, any portions cut out have higher abrasion resistance than the C/C composite which is the skeletal part, and besides the high heat dissipation and flexibility inherently possessed by the C/C composite can be maintained.

In the case of the molten metal pump which is another aspect of the present invention, at least the portions which contact with molten metal are made of the SiC—C/C composite material to impart sufficient thermal impact resistance and oxidation resistance to the molten metal pump and, simultaneously, inhibit dissolution of the components of the material of the molten metal pump into the molten metal. That is, the SiC—C/C composite material has excellent strength and thermal impact resistance not only at room temperature (20° C.), but also at high temperatures and is excellent in oxidation resistance and thus it gives the above characteristics to the molten metal pump. Especially, the material has the characteristic that thermal impact resistance is markedly higher than that of SIALON.

Figure 9:
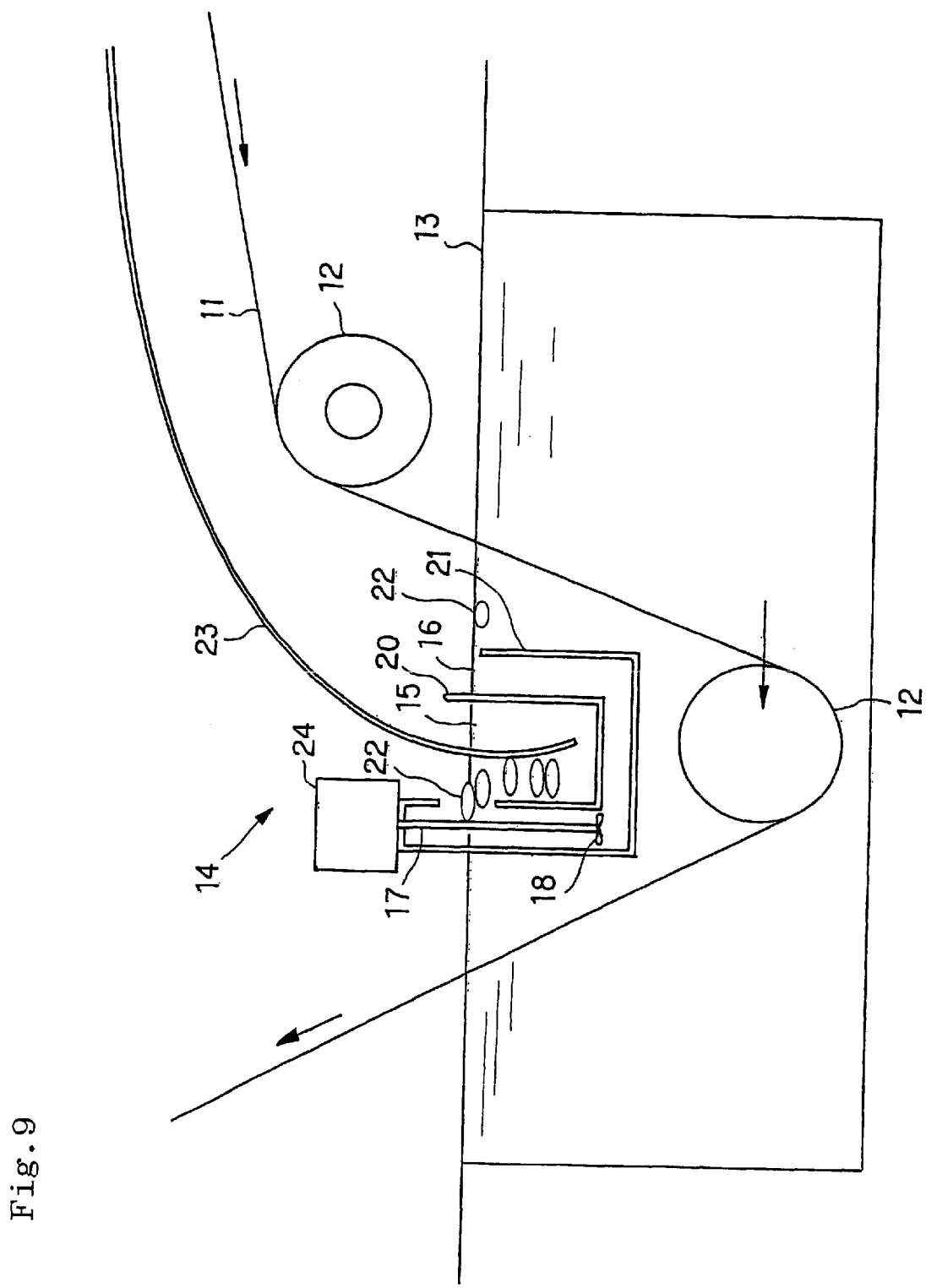
FIG. 9 is a schematic sectional view showing a general construction of the molten metal pump.

The molten metal pump of the present invention has no limitation in system and kind, and can be any pump which can be dipped in molten metal in use. For example, as shown in FIG. 9, a molten metal pump used for removing dross in molten metal generally has a dross storage portion and a dross passage having openings at both ends, one end opening of the dross passage communicating with surface part of the molten metal outside the dross storage portion and another end opening communicating with the surface part of the molten metal inside the dross storage portion. Furthermore, the dross passage has a means for causing liquid flow from one end side to another end side of the dross passage, such as an impeller fitted to a revolving shaft.

As shown in FIG. 9, a more specific embodiment of the above molten metal pump is such that the molten metal pump 14 is formed of at least an inner container 20, an outer container 21, a revolving shaft 17, an impeller 18 and a revolving shaft-driving part 24, the inner space of the inner container 20 forms a dross storage portion 15, and the space between the inner wall of the outer container 21 and the outer wall of the inner container forms a dross passage 16. In this case, the members which contact with molten metal 13 in use of the molten metal 14, such as inner container 20, outer container 21, revolving shaft 17 and impeller 18, are made of the above SiC—C/C composite material. Other members such as the revolving shaft-driving part 24 may also be made of this material. The kind of the molten metal in which the molten metal pump of the present invention is used has no limitation, and the pump can be suitably used in molten metals such as zinc, aluminum, iron, tin and copper, but the pump can be especially suitably used for molten zinc or molten aluminum when the molten metal temperature is taken into consideration.

The C/C composite in the present invention is a material comprising two-dimensionally or three-dimensionally arranged carbon fibers between which a matrix comprising carbon is formed as aforementioned, and this may contain elements other than carbon, such as boronnitride, boron, copper, bismuth, titanium, chromium, tungsten and molybdenum as far as 10–70% of carbon fibers are contained.

In the case of using the composite material having a matrix layer comprising SiC material on the surface, the SiC material melts to form glass, and the speed of protecting the skeletal part against oxygen is higher than the speed of diffusion of oxygen into the skeletal part. Therefore, the case can be avoided where the C/C composite used as the skeletal part is oxidized with the diffused oxygen, and the skeletal part can be protected from oxidation. Accordingly, the SiC—C/C composite material of the present invention shows self-restoration property and can be used for a long period of time. This effect is also obtained even when the matrix contains the third components such as boron nitride, copper and bismuth mentioned above.

Furthermore, since the SiC material is larger in thermal expansion coefficient than the C/C composite, when the SiC material is merely coated on the surface of the skeletal part, the layer comprising the SiC material readily peels off from the skeletal part due to the difference of thermal expansion coefficient in the use of long term under oxidizing condition at high temperatures while, in the present invention, the SiC material is formed integrally as a matrix layer of the SiC—C/C composite material, whereby strength of the fibers in the direction of lamination is increased and the peeling off can be inhibited and thus the material has excellent properties as sliding materials and braking members.

The SiC—C/C composite material of the present invention will be explained in more detail referring to the drawings.

Figure 2A:
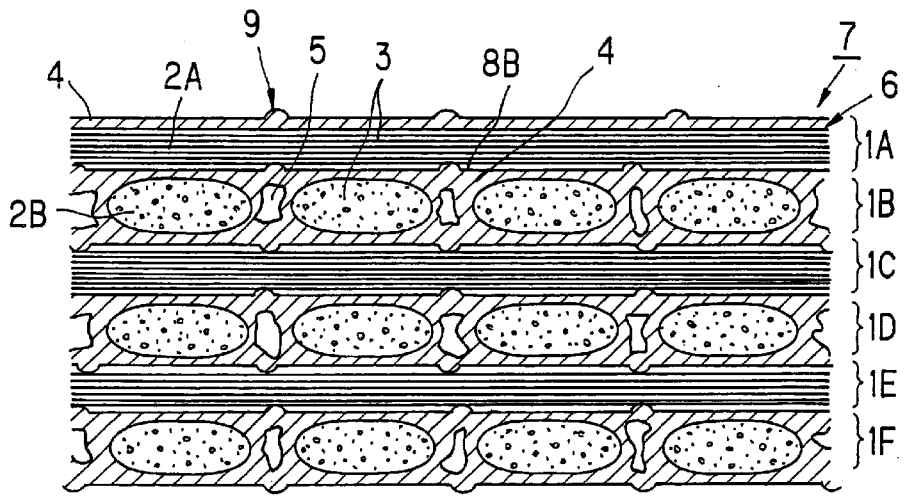
FIG. 2(a) is a cross-sectional view taken along the line IIa—IIa in FIG. 1.
Figure 2B:
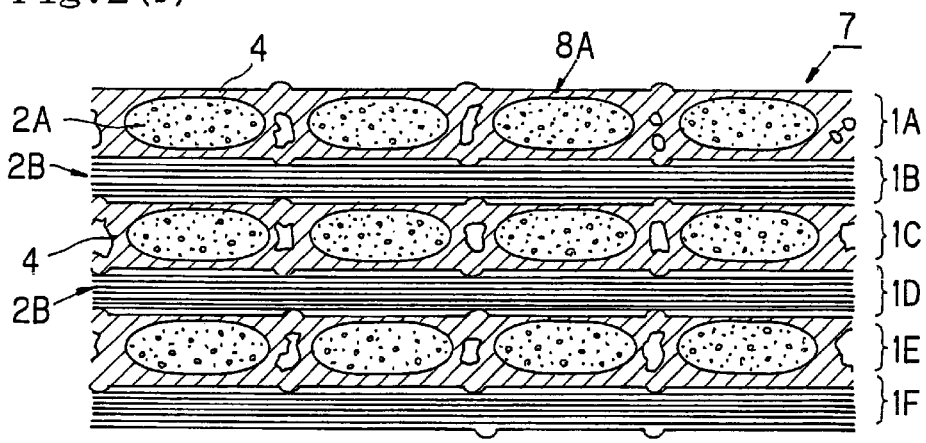
FIG. 2(b) is a cross-sectional view taken along the line IIb—IIb in FIG. 1.
Figure 3:
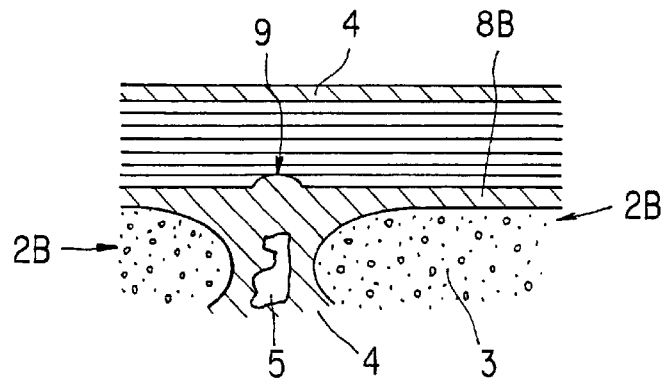
FIG. 3 is a partial enlargement of FIG. 2(a).

FIG. 1 is an oblique view which schematically explains the skeletal part of the SiC—C/C composite material of the present invention, FIG. 2(a) is a cross-sectional view of the SiC—C/C composite material of the present invention taken along the line IIa—IIa in FIG. 1, and FIG. 2(b) is a cross-sectional view of the SiC—C/C composite material of the present invention taken along the line IIb—IIb in FIG. 1. FIG. 3 is a partial enlargement of FIG. 2(a).

The skeletal part of SiC—C/C composite material 7 comprises yarn assembly 6. The yarn assembly 6 is formed by laminating, in vertical direction, yarns array elements 1A, 1B, 1C, 1D, 1E and 1F. In each yarn array element, yarns 3 are two-dimensionally arranged and the longer directions of the yarns are nearly in parallel with each other. The longer directions of the yarns in the yarn array elements adjacent to each other in vertical direction (upper and lower direction) cross at right angles with each other. The longer directions of yarns 2A in the yarn array elements 1A, 1C and 1E are parallel with each other and cross at right angles with the longer directions of yarns 2B in yarn array elements 1B, 1D and 1F. Each yarn comprises fiber bundle 3 composed of carbon fibers and carbon component other than the carbon fibers. The yarn assembly 6 in the form of three-dimensional lattice is formed by laminating the yarn array elements. Each yarn is flattened in the step of pressure molding mentioned later and is in nearly elliptic form.

In each of yarn array elements 1A, 1C and 1E, matrix 8A is filled between the adjacent yarns, and the matrix 8A extends along the surface of yarn 2A in parallel to the yarn 2A. In each of yarn array elements 1B, 1D and 1F, matrix 8B is filled between the adjacent yarns, and the matrix 8B extends along the surface of yarn 2B in parallel thereto.

As shown in FIG. 2(a), FIG. 2(b) and FIG. 3, matrices 8A and 8B comprise silicon carbide phase 4 which covers the surface of the yarns. A part of the silicon carbide phase may protrude from the surface as small protrusion 9 or may protrude into the carbon fiber layer inside the composite material. In this small protrusion, there are formed pores (voids) 5 having a pore diameter of about 100 μm as a median. Since most of the small protrusions 9 are formed along traces of the matrix comprising carbon component other than carbon fibers of the starting material C/C composite, density of the small protrusions 9 per unit area can be adjusted by suitably selecting the distance between the yarns and/or the distance between the yarn array elements. The silicon carbide phase 4 may also be formed between the adjacent yarn 2A and yarn 2B.

Each of the matrices 8A and 8B extends along the surface of the yarn narrowly, preferably, linearly, and the matrix 8A and the matrix 8B cross at right angles with each other. The matrix 8A in the yarn array elements 1A, 1C and 1E and the matrix 8B in the yarn array elements 1B, 1D and 1F which cross at right angles with 1A, 1C and 1E continue to each other at boundary between yarns 2A and 2B. As a result, the matrices 8A and 8B form a three-dimensional lattice as a whole.

Figure 4:
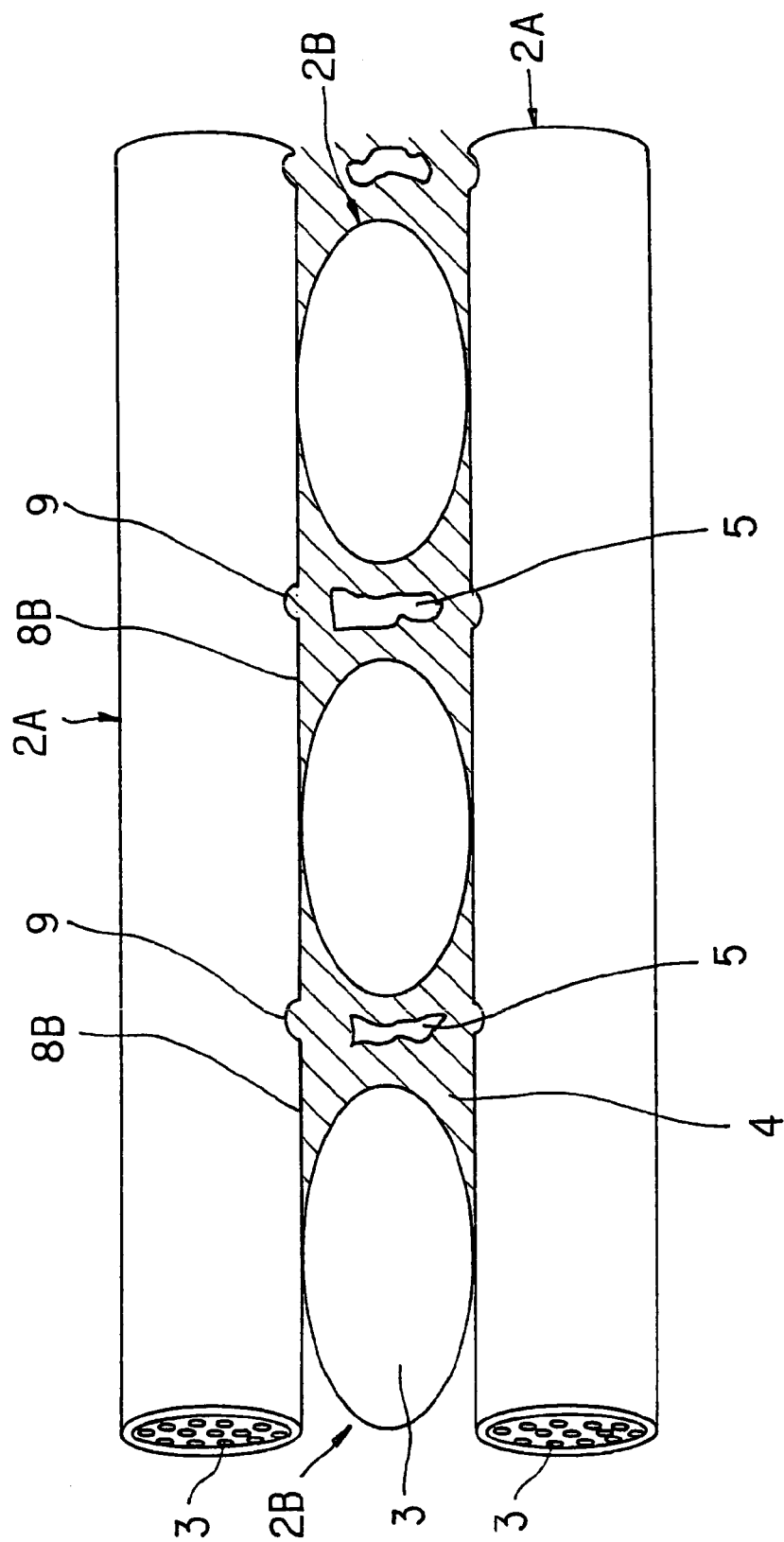
FIG. 4 is a partial sectional oblique view schematically showing the essential part of the SiC—C/C composite material of the present invention.

FIG. 4 is a partial sectional oblique view which schematically shows a part of the essential portion of the SiC—C/C composite material as an embodiment of the present invention. In this embodiment, matrices 8A and 8B are respectively formed between the adjacent yarns 2A and between the adjacent yarns 2B in the yarn array elements. The matrices 8A and 8B have the silicon carbide phase 4 formed in contact with the surface of the yarns 2A and 2B, respectively.

It is preferred that the SiC material phase has such an inclined composition as the carbon concentration decreases in proportion to the distance from the surface of the yarn.

As braking members and grinding members, it is preferred that the surface of the SiC—C/C composite material is silicon carbide phase and small protrusions 9 comprising silicon carbide are formed protruding at a relatively high density.

Thickness of the matrix layer formed by impregnating the skeletal part with SiC material is preferably at least 0.01 mm, more preferably at least 0.05 mm, further preferably at least 0.1 mm. If the thickness of the matrix layer is less than 0.01 mm, endurance required, for example, for sliding materials under high oxidizing conditions cannot be obtained.

Moreover, concentration of silicon bonded to carbon in the matrix layer of the SiC—C/C composite material of the present invention preferably decreases inwardly from the surface toward the inner portion.

By giving an inclination to the silicon concentration in the matrix layer, corrosion resistance and strength, and healing function for defects in the surface layer part and inner layer part in strongly oxidative corrosion environment can be highly improved, and, besides, thermal stress deterioration of the material due to the difference in thermal expansion coefficient can be inhibited. This is because the silicon concentration in the surface layer part is relatively higher than in the inner layer part, and, hence, micro-cracks generated are healed during heating to maintain oxidation resistance.

Furthermore, the C/C composite used in the SiC—C/C composite material of the present invention may contain at least one substance selected from the group consisting of boron nitride, boron, copper, bismuth, titanium, chromium, tungsten and molybdenum.

Since these substances have lubricity, when these are contained in the skeletal part comprising C/C composite, lubricity of the fibers in the skeletal part impregnated with SiC material can be maintained and decrease of tenacity can be inhibited.

For example, content of boron nitride is preferably 0.1–40% by weight based on 100% by weight of the skeletal part comprising the C/C composite. If the content is less than 0.1% by weight, the effect of imparting lubricity by boron nitride cannot be sufficiently obtained, and if it is more than 40% by weight, the brittleness of boron nitride appears also in the SiC—C/C composite material.

The SiC—C/C composite materials of the present invention explained above possess together the impact resistance, high hardness and light weight of the C/C composite and the oxidation resistance, spalling resistance, self-lubricity and abrasion resistance of the SiC material, and, in addition, have self-restoration properties. Therefore, they can stand the long term use under oxidizing conditions at high temperatures, and can be suitably used as sliding materials and braking members. In addition, members for molten metal, especially molten metal pumps made of the composite material which constitute another aspect of the present invention are excellent in thermal impact resistance and oxidation resistance and, besides, do not release the components which contaminate the molten metal. Thus, the molten metal pumps can be said to be markedly superior pumps.

The SiC—C/C composite material of the present invention can be produced preferably by the following method, which is one aspect of the present invention.

That is, a powdery binder which acts as matrix and finally becomes free carbon, such as pitch or coke and, if necessary, a phenolic resin powder are incorporated in a bundle of carbon fibers, whereby carbon fiber bundles are prepared. A flexible film comprising a plastic such as thermoplastic resin is formed around carbon fiber bundles as disclosed in JP-A-2-80639 to obtain preformed yarns which are flexible intermediate materials. The preformed yarns are made to a sheet-like prepreg sheet, and a desired number of the sheets are laminated, followed by molding the laminate by a hot press under the conditions of 300–2000° C. and normal pressure to 500 kg/cm² to obtain a molded body. If necessary, this molded body is carbonized at 700–1200° C. and graphitized at 1500–3000° C. to obtain a fired body.

The carbon fibers may be either pitch carbon fibers obtained by preparing a pitch for spinning from petroleum pitch or coal tar pitch, melt spinning the pitch, rendering the spun fibers infusible and carbonizing the fibers or PAN carbon fibers obtained by carbonizing acrylonitrile (co) polymer fibers.

As carbon precursors necessary for the formation of matrix, there may be used thermosetting resins such as phenolic resin and epoxy resin, tar, pitch, etc. and these may contain cokes, metals, metal compounds, inorganic and organic compounds, etc.

Then, the molded body or the fired body prepared as mentioned above and silicon carbide are kept in a furnace at 1100–1400° C., under an inner pressure of 0.1–10 hPa for 1 hour or more. The keeping time is variable depending on various factors, and can be such as being sufficient to remove, from the firing atmosphere, gases such as CO generated with changing of inorganic polymers or inorganic materials to ceramics and sufficient to inhibit external contamination of the firing atmosphere with $O_2$ in the air. Furthermore, in this case, it is preferred to form an SiC layer on the surface of the molded body or the fired body with flowing an inert gas in an amount of 0.1 NL (normal litter: corresponding to 5065 liters in the case of 1200° C. and a pressure of 0.1 hPa) or more per 1 kg of the total weight of the molded body or the fired body and silicon. Then, the temperature is raised to 1450–2500° C., preferably 1700–1800° C. to melt and impregnate silicon into open pores of the molded body or the fired body to first form the SiC material.

Then, the furnace inner temperature is once reduced to the environmental temperature (20–25° C.) or the furnace inner pressure is increased to about 1 atm with keeping the inner temperature as it is, and the inner temperature is raised to 2000–2800° C., preferably 2100–2500° C., whereby metallic silicon which may remain and the already produced silicon carbide are diffused into the carbon fibers and the carbon component other than carbon fibers (which has the same meaning as free carbon containing partially graphitized carbon) and are reacted with these carbons. About 1 hour is sufficient as the keeping time in this case. In case a molded body comprising C/C composite is used in this process, firing of the molded body is also conducted to produce simultaneously an SiC—C/C composite material.

It is preferred that the molded body or the fired body and silicon carbide are kept at 1100–1400° C., under an inner pressure of 0.1–10 hPa for 1 hour or more, and in this case, it is desirable to control the inert gas to flow in an amount of 0.1 NL or more, preferably 1 NL or more, further preferably 10 NL or more per 1 kg of the total weight of the molded body or the fired body and silicon.

In this way, by carrying out the firing (namely, the stage before melting and impregnation of metallic silicon) in an inert gas atmosphere, the gas such as CO generated with changing of inorganic polymers or inorganic materials to ceramics is removed from the firing atmosphere and the external contamination of the firing atmosphere with $O_2$ in the air is inhibited, and, as a result, porosity of the composite material obtained by subsequent melting and impregnation of metallic silicon can be maintained at lower level.

Furthermore, when the molten metallic silicon is molten and impregnated in the molded body or the fired body, the atmospheric temperature is raised to 1450–2500° C., preferably 1700–1800° C. In this case, the inner pressure of the firing furnace is preferably 0.1–10 hPa. Then, reaction of silicon including the metallic silicon with carbon is completed, and the furnace inner pressure is increased to about 1 atm. and the furnace inner temperature is raised to 2000–2800° C., preferably 2100–2500° C. in order to diffuse silicon carbide into carbon fibers and the carbon component other than the carbon fibers. The raising of temperature may be started after cooling to room temperature or may be started as it is. By this heat treatment at high temperature under normal pressure, the metallic silicon completely disappears. Thus, even in the case of using as a molten metal pump, no metallic silicon dissolves out into the metal in the molten metal. Furthermore, silicon carbide formed by the heat treatment under reduced pressure diffuses into the carbon fibers and the carbon component other than the carbon fibers to form SiC material and simultaneously pores of large pore diameter are formed inside the matrix from which silicon has been removed.

Thus, there are formed two kinds of pores, namely, those of relatively small pore diameter produced by the heat treatment under reduced pressure and those of relatively large pore diameter formed by heating at high temperature and under normal pressure. That is, an SiC—C/C composite material having two-peak type distribution of pore diameter is obtained. Due to the presence of the two kinds of pores which appear as micro-pores on the surface when the material is processed to make a member, roughness of the surface becomes great and kinetic coefficient of friction is larger than that of starting material C/C composite. Therefore, when the composite material is used as braking members, the higher braking effect is exhibited in addition to the effects of improvement of oxidation resistance and mechanical strength caused by the formation of SiC as the matrix.

Since the phenomenon of expansion in the longer direction of the C/C composite at the time of firing is inhibited in the reaction of formation of silicon carbide, precision of size in the longer direction of molded body can be enhanced. Therefore, a large-sized thin-wall molded article which cannot be produced using silicon carbide materials can be easily produced using the SiC—C/C composite material of the present invention. Especially, since the SiC—C/C composite material of the present invention is high in oxidation resistance and excellent in physical characteristics including hardness, flexural modulus, tensile modulus, etch, large-sized thin-wall members which are required to have high temperature resistance and oxidation resistance and which cannot conventionally be produced can be relatively easily produced. The degree of formation of silicon carbide can be continuously changed by controlling the amount of metallic silicon used, the heating temperature under reduced pressure, and the heating temperature under normal pressure. Therefore, the method can be said to be an excellent method in which hardness, gas permeability, Young's modulus, thermal conductivity and thermal expansion coefficient can be changed in specific ranges in accordance with the characteristics required in the fields of use.

As mentioned above, when a flexible intermediate material comprising an organic material is used on the outer surface of the carbon fiber bundles and combined with impregnation and melting of silicon, the flexible intermediate material undergoes thermal decomposition in the molded body or fired body to leave long and narrow open pores in the spaces between the yarns, and silicon easily penetrates into the deep portion of the fired body or molded body through the open pores. During this penetration, silicon reacts with carbon of the yarns to gradually carbonize the yarn from the surface side, and as a result, the SiC—C/C composite material used in the present invention can be produced. Depending on use, the SiC—C/C composite material having the above construction may be formed as so-called SiC—C/C composite material layer in only a part of the surface layer portion of the skeletal part comprising the C/C composite.

Adjustment of the depth of the matrix layer is carried out by adjusting the open pore content and pore diameter thereof in the molded body or fired body. For example, in the case of adjusting the thickness of the SiC material layer to 0.01–10 mm, at least the open pore content in the vicinity of the surface of the molded body or fired body is adjusted to 5–50% and average pore diameter is adjusted to 1 μm or larger. The open pore content in the molded body or fired body is preferably 10–50%, and the average pore diameter is preferably 10 μm or larger. If the open pore content is less than 5%, the binder in the molded body or fired body cannot be completely removed, and if it is more than 50%, the SiC material impregnates deeply into the skeletal part to cause deterioration of impact resistance of the composite material.

In order to form the SiC—C/C composite material layer only in the surface of the C/C composite, it is preferred to use a molded body adjusted so that the open pore content at least in the vicinity of the surface is 0.1–30% during the firing. That is, this can be attained by adjusting thickness of the film of the flexible intermediate material comprising heat-decomposable organic material on the carbon fiber bundles.

In order that the open pore content in the molded body or the fired body is lowered from the surface toward the inner portion, a plurality of preformed sheets comprising preformed yarns differing in binder pitch are arranged so that the binder pitch increases from the inside toward the surface side, followed by molding them.

Furthermore, when an inclination is given to the silicon concentration in the SiC—C/C composite material layer, the composite material is produced using a fired body adjusted so that the open pore content in the vicinity of the surface decreases from the surface toward the inside or a molded body adjusted so that the open pore content at least in the vicinity of the surface decreases from the surface toward the inside during the firing. Control of the porosity of the SiC—C/C composite material to 0.5–5% can be easily attained by adjusting the amount of metallic silicon depending on the open pore content of the molded body or fired body in impregnating the molded body or the fired body with metallic silicon.

Sliding materials, braking members, molten metal jigs, etc. can be produced from the novel SiC—C/C composite material by cutting the composite material to a suitable size and subjecting it to surface grinding by a surface grinding machine.

For making a large-sized member of a specific shape, first the C/C composite is molded into a desired shape, and with or without firing it, a matrix comprising silicon carbide is formed in the presence of metal silicon by a virtue of the method for the production of the SiC—C/C composite material of the present invention. The SiC—C/C composite material of the present invention can be suitably used as sliding materials and braking members, especially for sliding materials and braking members of mass-transportation means, and, further, as molten metal jigs used at high temperatures.

EXAMPLES

The present invention will be explained in more detail by the following non-limitative examples.

Density of the SiC—C/C composite material of the present invention was measured by Archimedean method, and hardness was measured in accordance with JIS K7202, and other characteristics were evaluated by the following methods.

Measurement of Open Pore Content

Open pore content(%)=$[(W_3-W_1)/(W_3-W_2)] \times 100$ (according to Archimedean method).

Dry weight ($W_1$): The sample was dried in an oven at 100° C. for 1 hour and then weighed.

Weight of the sample in water ($W_2$): The sample was boiled to completely fill the open pores with water and weighed in water.

Weight of the hydrous sample ($W_3$): The sample the open pores of which were completely filled with water was weighed in the air.

Measurement of Flexural Strength

A test piece of 10 mm×50 mm×2 mm in size was subjected to three-point flexing test, and the flexural strength was calculated by the following formula.

$$\text{Flexural strength} = 3/2 F_{MAX} L/b\, h^2$$

(wherein b denotes width of the test piece, $F_{MAX}$ denotes maximum load, h denotes height of the test piece, and L denotes distance between the supports).

Measurement of Flexural Modulus

The test piece was subjected to three-point flexing test with the distance between the supports being 40 times the height h of the test piece, and the flexural modulus was calculated by the following formula using the initial gradient P/σ of the linear part of the load-deflection curve.

$$\text{Flexural modulus} = 1/4 L^3/b\, h^3\, P/\sigma$$

(wherein b denotes width of the test piece, h denotes height of the test piece, and L denotes distance between the supports).

Measurement of Tensile Strength

A test piece of 9.5 mm×100 mm×6 mm in size, 6.25 mm in thickness of central part, 28.5 mm in length of the central part, and 38 mm in curvature radius of both ends and central part was subjected to tensile loading, and the maximum load just before breaking was obtained. The tensile strength was obtained by dividing the maximum load by sectional area of the test piece.

Measurement of Tensile Modulus

A test piece having the same size as in the tensile strength test was pulled, and the tensile modulus was obtained by dividing the tensile stress by the strain generated in the test piece.

Measurement of Compression Strength

A compression load was applied to the test piece and the compression strength was calculated by the following formula.

Compression strength=$P/A$ (wherein P denotes the load at maximum loading and A denotes the minimum sectional area of the test piece).

Measurement of Interlaminar Shear Strength

The test piece was subjected to three-point flexing test with the distance between the supports being 4 times the thickness h of the test piece, and the interlaminar shear strength was calculated by the following formula.

Interlaminar shear strength=$3P/4bh$ (wherein P denotes the maximum flexing load at break, b denotes width of the test piece, and h denotes height of the test piece).

Measurement of Shear Strength

A load was applied to a test piece of 10 mm×25 mm×6 mm in size, and the load when the test piece was broken was taken as the maximum load. This maximum load was divided by the area of the test piece to calculate the breaking load.

Measurement of IZOD Impact Strength

A notched test piece of 10 mm×100 mm×6 mm in size was mounted on a testing stand, and an impact was applied to the notched side by a hammer to break the test piece. The impact strength was calculated by dividing the absorption energy by the sectional area of the notched portion of the test piece.

Measurement of Kinetic Coefficient of Friction

A test piece was set at a jig and rotated at 100 rpm for 10 minutes, and another material (SUJ 10 mm ball) was pressed to the test piece at a load Fp(N) of 2 kg, and friction force Fs(N) at that time was measured. The kinetic coefficient of friction was calculated by the following formula.

Coefficient of friction $\mu=Fs/Fp$

Measurement of Temperature at Which Weight Reduced by 5%

Change of weight of the sample was measured with applying sufficient stream in the air and with raising the temperature at a rate of 10° C./min, and the temperature at which the weight of the sample reduced by 5% was obtained.

EXAMPLE

1. Production of SiC—C/C Composite Material of the Present Invention

A powdery binder pitch which acts as a matrix for bundles of carbon fibers and finally becomes free carbon for the bundles of carbon fibers was included in carbon fibers arranged in one direction, and, further, phenolic resin powder and others were contained therein to prepare carbon fiber bundles. A flexible film comprising a plastic such as a thermoplastic resin was formed around the resulting carbon fiber bundles to obtain preformed yarns which were flexible intermediate materials. The resulting preformed yarns are formed into a sheet by the method disclosed in JP-A-2-80639, and a necessary number of the sheets were laminated so that the directions of the carbon fibers in adjacent sheets cross at right angles. The resin of the laminate was cured by a hot press at 180° C. and under 10 kg/cm². Then, the laminate was fired at 2000° C. in nitrogen to obtain a C/C composite having a thickness of 10 mm. The resulting C/C composite had a density of 1.0 g/cm³ and an open pore content of 50%.

Then, the resulting C/C composite was put in a carbon crucible filled with metallic silicon powders of 99.8% in purity and 1 mm in average particle size in an amount enough to give a porosity of 5%. Then, the carbon crucible was transferred into a firing furnace. The C/C composite was treated under the conditions of a temperature in the firing furnace of 1300° C., a flow rate of argon gas as an inert gas of 20 NL/min, a pressure in the furnace of 1 hPa, and a holding time of 4 hours. Thereafter, the temperature in the furnace was raised to 1600° C. with keeping the pressure in the furnace as it was, thereby to impregnate the C/C composite with metallic silicon to obtain an SiC—C/C composite material having a porosity of 5%.

Density, porosity, interlaminar shear strength, compression strength, flexural modulus, etc. of the resulting SiC—C/C composite material were measured and the results are shown in Table 1 in comparison with those of the C/C composite used as a skeletal part. As can be seen from the results shown in Table 1, there are recognized remarkable increase of hardness and improvement of flexural modulus, tensile strength, compression strength, shear strength, etc. as compared with the C/C composite which is a comparative example, and, on the other hand, decrease in flexing strength, IZOD impact strength, etc. is seen owing to the brittleness inherently possessed by SiC, but the decrease in these properties is within the tolerance range, taking into consideration the remarkable improvement of oxidation resistance.

Figure 7:
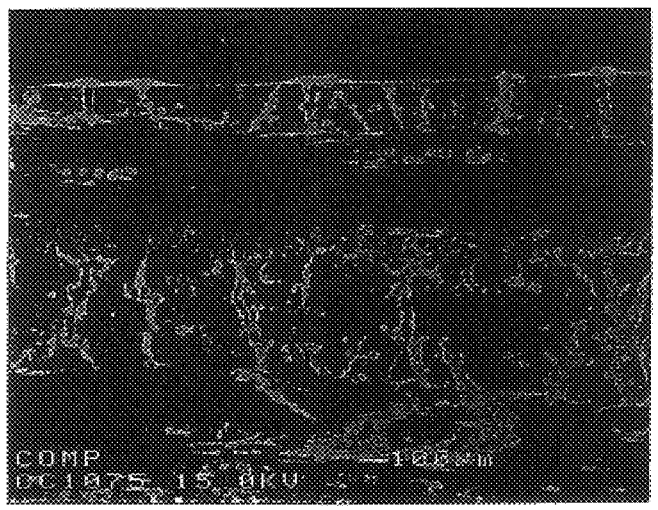
FIG. 7 is a photograph showing the phase structure of the section of the same test piece.
Figure 8:
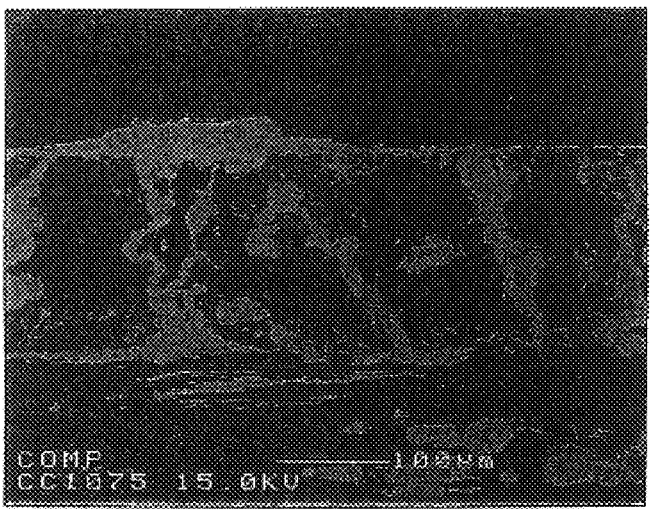
FIG. 8 is an enlarged photograph of one example of the open pore formed in the matrix in FIG. 7.

Furthermore, FIG. 6 is a secondary electron image photograph showing the surface state of the test piece. FIG. 7 is a reflecting electron image photograph showing the sectional structure of the test piece. FIG. 8 is an enlarged photograph of FIG. 7. It can be seen from FIGS. 6–8 that a part of the produced SiC protruded from the surface as fine protrusion 9. It can also be seen that this protrusion was formed along the matrix of the C/C composite. It can also be seen that voids, namely, pores were formed in the protrusion. It is a characteristic that the pores include two kinds of pores, namely, large pores and small pores. The large pores had a median of pore diameter of about 100 μm, and the formation thereof can be clearly recognized in the enlarged photograph shown in FIG. 8. The small pores had a small median of about 0.5 μm, and presence thereof cannot be directly recognized in FIG. 8.

However, when the composite material was processed as a braking member, the surface roughness increased because the fine pores appearing on the surface comprised two kinds of pores differing in diameter. That is, since the surface roughness was greater than that of the C/C composite and kinetic coefficient of friction increased, and as a result, the braking effect was improved. The content of metallic silicon was 40%.

A test piece was cut out from the C/C composite surface layer part in which the SiC material and the C/C composite were sufficiently integrated in the above SiC—C/C composite material, and the test piece was subjected to cutting process into a size of 60 mm in length, 60 mm in width, 5 mm in thickness by a surface grinding machine and then to surface grinding by #800 grinding stone to make a sliding material. Surface roughness of the ground surface of the resulting sliding material was Ra=1 μm, and flatness was 2 μm in straightness. This was subjected to performance test as a sliding material to find that this was especially excellent in oxidation resistance at high temperatures as compared with one produced from the C/C composite.

TABLE 1

| | Example | Comparative Example |
|---|---|---|
| Impregnation rate of Si (%) | 40 | 0 |
| Density (g/cm³) | 2.23 | 1.67 |
| Hardness HRP | 51.5 | Collapse |
| Porosity (%) | 4.43 | 15 |
| Flexural Strength (kgf/mm²) | 10.7 | 24.5 |
| Flexural Modulus (kgf/mm²) | 4771 | 3394 |
| Tensile Strength (kgf/mm²) | 4.59 | Impossible to Measure due to Breaking at chunk Part |
| Tensile modulus (kgf/mm²) | 7808 | 3619 |
| Compression Strength (kgf/mm²) | 25 | 13.1 |
| Interlaminar Shear Strength (kgf/mm²) | 1.42 | 1.36 |
| Shear Strength (kgf/mm²) | 2.48 | 1.72 |
| IZOD strength (kgf/mm²) | 7.7 | 28.2 |
| Kinetic coefficient of friction | 0.238 | 0.146 |

It can be seen from Table 1 that the composite material of the present invention composed of a skeletal part comprising a C/C composite and a matrix comprising an SiC material formed around the skeletal part had a greater kinetic coefficient of friction as compared with the C/C composite used as a skeletal part.

Furthermore, the composite material of the present invention was superior to the C/C composite in flexural modulus, tensile strength, tensile modulus, compression strength, and shear strength, and was nearly the same as the C/C composite in interlaminar shear strength. Although it was inferior to the C/C composite in flexing strength, tensile strength and IZOD impact strength, this was practically acceptable in the uses requiring high oxidation resistance, such as sliding materials, braking members and members used in molten metal.

2. Molten Metal Pump

Removal of dross from molten aluminum was carried out using a molten metal pump made of the above SiC—C/C composite material, and occurrence of cracks in the members constituting the molten pump, oxidation thereof and dissolution of silicon into the melt were examined.

As shown in FIG. 9, molten aluminum 13 was for plating of steel sheets, and had a temperature of 750° C. Furthermore, as shown in FIG. 9, molten metal pump 14 was composed of inner container 20, outer container 21, revolving shaft 17, impeller 18 and revolving shaft driving part 24, and the inner space of the inner container 20 formed dross storage portion 15, and the space between the inner wall of the outer container 21 and the outer wall of the inner container 20 formed dross passage 16. Of these members, the inner container 20, the outer container 21, the revolving shaft 17 and the impeller 18 were made of the above material.

The molten metal pump 14 was dipped in the molten aluminum 13, and removal of dross was carried out for 100 hours with revolving the impeller 18, and, thereafter, occurrence of cracks in the members constituting the molten pump, oxidation thereof and dissolution of silicon into the melt were examined.

The occurrence of cracks was visually examined on the members of inner container, outer container, revolving shaft and impeller. As the indicator for the degree of oxidation, reduction of weight of these members was measured. Oxidation resistance was evaluated by the following criteria. When the weight reduction was less than 5%, this is indicated by ○, when it was 5% or more and less than 10%, this is indicated by Δ, and when it was 10% or more, this is indicated by X. The dissolution of silicon into the melt was judged by examining the change in composition of the test piece. The results were indicated as follows. When presence of silicon in aluminum was confirmed by X-rays, this is indicated by "yes", and when the presence of silicon was not recognized, this is indicated by "no". As a result, no cracks occurred, there were naturally no problems in oxidation resistance, and no dissolution of silicon into the melt occurred.

On the other hand, a molten metal pump in which the inner container, the outer container, the revolving shaft and the impeller were made of SIALON was prepared in the same manner as above, and removal of dross in molten aluminum was carried out using the molten metal pump, and examination was conducted on occurrence of cracks in the members constituting the pump, oxidation thereof and dissolution of silicon into the melt. There were no problems in oxidation resistance and dissolution of silicon, but occurrence of cracks was clearly seen after use for 100 hours.

In the case of the molten metal pump made of SIALON, degree of oxidation was small, but occurrence of cracks was seen in the outer container in the vicinity of the surface of the molten aluminum. On the other hand, in the case of the molten metal pump of the present invention, no cracks occurred in all of the members of the inner container, the outer container, the revolving shaft and the impeller, and, besides, degree of the oxidation was low. Of course, dissolution of silicon into the molten metal was not seen.

Figure 5:
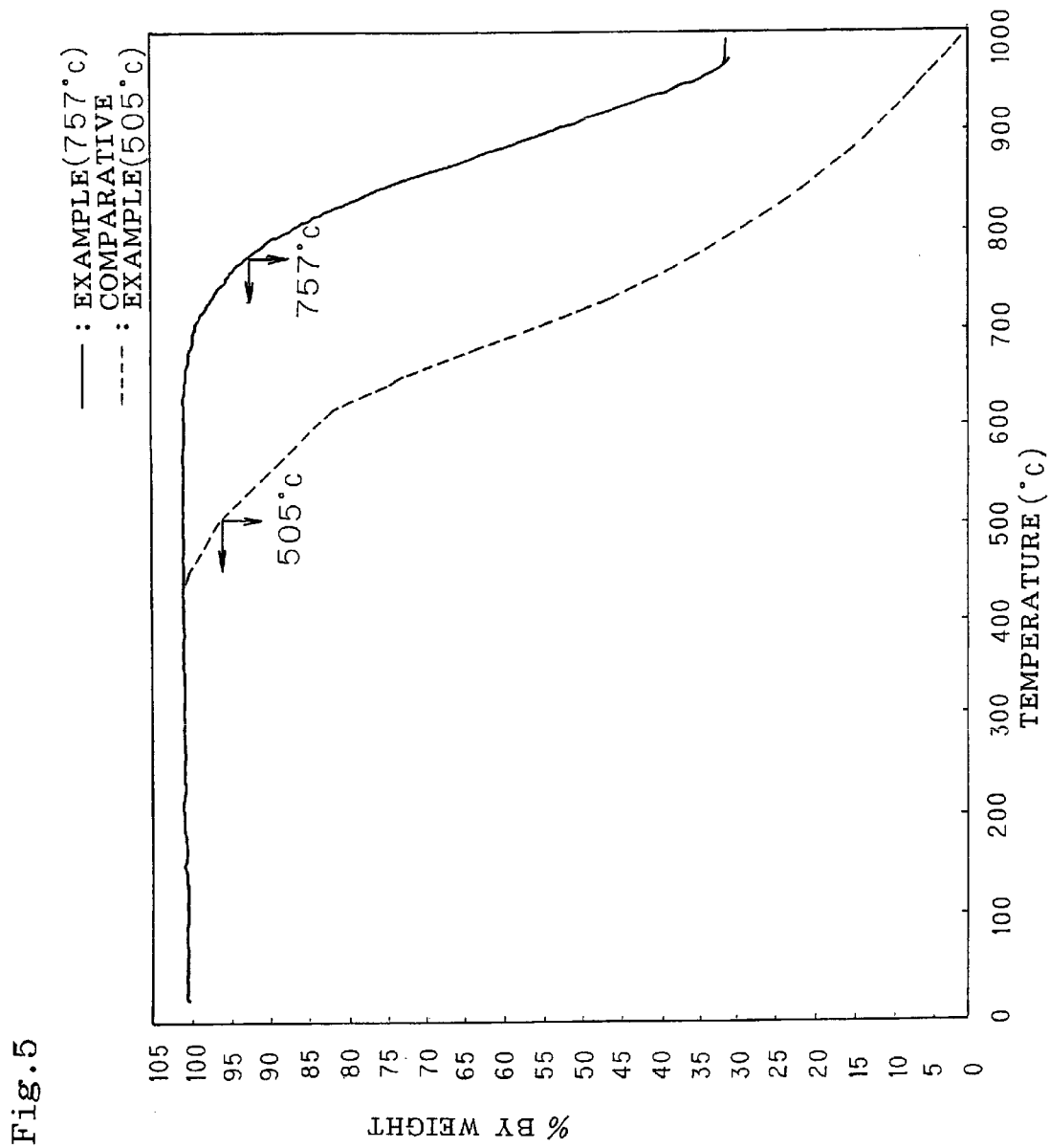
FIG. 5 is a chart showing the relation between temperature and decrease in weight.

When the novel SiC—C/C composite materials of the present invention are used as sliding materials, they have a kinetic coefficient of friction in a suitable range of 0.05–0.5, and a matrix is formed of an SiC material having oxidation resistance, creep resistance and spalling resistance, and thus the low oxidation resistance of C/C composite can be overcome, and, therefore, even in the presence of oxygen, the sliding materials can be used at high temperatures at which oil cannot be used as a lubricant. Moreover, as shown in FIG. 5, the composite materials have a high temperature of 757° C. at which the weight reduces by 5%, said temperature being an indicator for oxidation characteristics, and have high high-temperature resistance characteristics. Therefore, the composite materials are useful as sliding materials used under the condition exposed to high temperature. Furthermore, since a C/C composite is employed as a skeletal part, the composite materials are light in weight and small in kinetic coefficient of friction and, hence, small in loss of energy and meet the demand for energy saving. Moreover, since the skeletal part is C/C composite, the composite materials are high in tenacity, hardness and impact resistance. Accordingly, the defect of low impact resistance of SiC fiber-reinforced SiC composite materials can be overcome, and the composite materials can also be used as sliding material having complicated shape or thin-wall portions.

When the novel SiC—C/C composite materials of the present invention are used as braking members, since they are highly excellent in abrasion resistance under high temperature conditions in the presence of oxygen, and a layer comprising an SiC material having oxidation resistance, creep resistance and spalling resistance is provided on the surface, the low oxidation resistance of C/C composite can be overcome, and the sliding materials can be used at high temperatures and in the presence of oxygen. Furthermore, the sliding materials have excellent abrasion resistance together. Especially, since the range of fluctuation of kinetic coefficient of friction is small even under bad environmental conditions, the composite materials are clearly very promising materials as braking members in braking devices such as of aircraft which require high reliability even under bad conditions. Particularly, the composite materials have two kinds of pores differing in pore diameter, the surface roughness increases, and is greater than that of the C/C composite. Thus, they have extremely excellent properties as braking members for mass-transportation means. Moreover, since the skeletal part comprises the C/C composite, weight is light, loss of energy is small, and demand for energy savings is met.

Further, since the skeletal part comprises the C/C composite, the composite materials are high in tenacity, hardness and impact resistance. Therefore, they exhibit the effect to increase kinetic coefficient of friction for mass-transportation means used at high temperatures and in the presence of oxygen. Moreover, as shown in FIG. 5, the composite materials have a high temperature of 757° C. at which the weight reduces by 5%, said temperature being an indicator for oxidation characteristics, and have high high-temperature resistance characteristics. Therefore, the composite materials are useful as molten metal members used under conditions exposed to high temperature. For example, since in the molten metal pump of the present invention, at least the portions which contact with molten metal are made of the SiC—C/C composite materials having excellent thermal impact resistance and oxidation resistance, even when they are used in a molten metal of high temperature for a long time, they do not crack or are not oxidized, and the life of the molten metal pump can be prolonged. As a result, production cost for plated articles can be lowered. Furthermore, since silicon hardly dissolves into the molten metal, reduction of plating purity of the plated articles caused by the dissolved silicon can be inhibited.

What is claimed is:

1. A method for producing an SiC—C/C composite material comprising silicon carbide, carbon fibers and a carbon component other than the carbon fibers and having a structure comprising a skeletal part and a matrix formed around the skeletal part, at least 50% of silicon carbide being of β type, the skeletal part being formed of carbon fibers and a carbon component other than the carbon fibers, silicon carbide capable of being present in a part of the skeletal part, the matrix being formed of silicon carbide, the matrix and the skeletal part being integrally formed, and the composite material having a porosity of 0.5–5% and a two-peak type distribution of average pore diameter, said method comprising a step of keeping metallic silicon and a molded body comprising a C/C composite or a C/C composite fired body in a furnace at a furnace inner temperature of 1100–1400° C. and under a furnace inner pressure of 0.1–10 hPa for 1 hour or more with flowing an inert gas in an amount of 0.1 NL or more per 1 kg of total weight of the molded body or the fired body and the metallic silicon, thereby reacting the carbon component constituting the matrix of the C/C composite with the metallic silicon to form a matrix comprising silicon carbide, a step of raising the furnace inner temperature to 1450–2500° C. with keeping the furnace inner pressure as it is, thereby melting and impregnating the metallic silicon into open pores of the molded body or the fired body to grow silicon carbide and simultaneously sufficiently filling the remaining pores with the metallic silicon, and a step of increasing the furnace inner pressure to about 1 atm with once reducing the furnace inner temperature to environmental temperature or keeping the furnace inner temperature as it is, and raising the furnace inner temperature to 2000–2800° C., whereby the produced silicon carbide is diffused from the matrix into the C/C composite composed of the carbon fibers and a carbon component other than carbon fibers and is reacted with the carbon.

2. A method for producing an SiC—C/C composite material according to claim 1, wherein open pore content in the vicinity of the surface of the C/C composite used is 5–50%.

* * * * *

UNITED STATES PATENT AND TRADEMARK OFFICE
CERTIFICATE OF CORRECTION

PATENT NO.    : 6,627,143 B2
DATED         : September 30, 2003
INVENTOR(S)   : Shigeru Hanzawa and Kenji Nakano It is certified that error appears in the above-identified patent and that said Letters Patent is hereby corrected as shown below:

Column 7,
Line 16, please change "(yam)" to -- (yarn) --;
Line 42, please change "yams" to -- yarns --;
Line 42, please change "yam" to -- yarn --.

Column 9,
Lines 13, 18 and 20, please change "yam" to -- yarn --.

Signed and Sealed this

Sixth Day of January, 2004

JAMES E. ROGAN
*Director of the United States Patent and Trademark Office*